Figure 1:
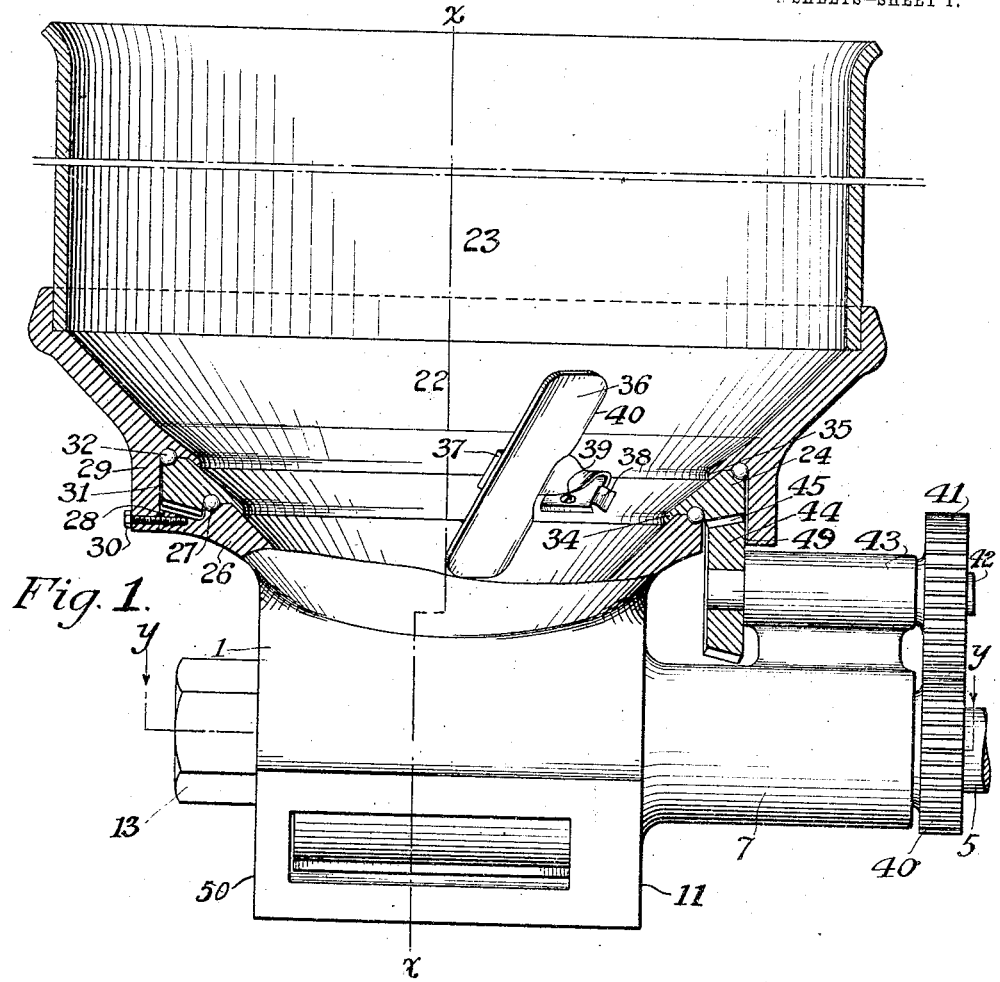

D. BRIGHTBILL.
SAUSAGE STUFFING MACHINE.
APPLICATION FILED APR. 26, 1909.

932,372.

Patented Aug. 24, 1909.
2 SHEETS—SHEET 1.

WITNESSES
John C. Houck
R. J. Boyer

INVENTOR
David Brightbill
BY
Frank H. Lehman
ATTORNEY

D. BRIGHTBILL.
SAUSAGE STUFFING MACHINE.
APPLICATION FILED APR. 26, 1909.

932,372.

Patented Aug. 24, 1909.
2 SHEETS—SHEET 2.

WITNESSES
John C. Houck
R. J. Boyer

David Brightbill, INVENTOR
BY
Frank H. Lehman
ATTORNEY

UNITED STATES PATENT OFFICE.

DAVID BRIGHTBILL, OF LEBANON, PENNSYLVANIA.

SAUSAGE-STUFFING MACHINE.

932,372.  Specification of Letters Patent.  Patented Aug. 24, 1909.

Application filed April 26, 1909. Serial No. 492,292.

*To all whom it may concern:*

Be it known that I, DAVID BRIGHTBILL, a citizen of the United States, residing in the city of Lebanon, county of Lebanon, and State of Pennsylvania, have invented certain new and useful Improvements in Sausage-Stuffing Machines, of which the following is a specification.

This invention relates to sausage-stuffing machines, and particularly to continuous sausage-stuffing machines, wherein rotary forcing means are provided to act upon minced meat placed in a suitable hopper in order to direct the same, under constant pressure, into the skins. Machines of this type are distinguished from reciprocating piston-stuffers, and are superior thereto in the respect that they are capable of operation without the loss of such time as is necessarily incident to the intermittent action of a piston.

The primary object of the invention is to provide a stuffing machine of this class which will be positive and reliable in action, and will not choke or become clogged by reason of the meat adhering to the sides of the hopper or becoming packed therein and failing to descend freely into the forcing chamber. Heretofore, one of the chief obstacles to the use of continuous stuffing machines has been the difficulty experienced in feeding the meat evenly and in constant quantity from the hopper into the device whereby the pressure is applied. To meet the requirements of machines of this class, wide mouthed funnel shaped hoppers, having comparatively narrow and constricted outlets are commonly and most conveniently employed, and heretofore the practice has largely been to place the meat in the hopper and permit it to feed automatically by its own weight into the forcing chamber without the aid of any continuous feeding device arranged in the hopper itself. The result, as shown by experience, is, that being of a glutinous, part fluid consistency, the meat not infrequently adheres to the walls of the hopper, and becomes caked and tightly compressed immediately above the outlet to such an extent that the superposed material is incapable of forcing a passage therethrough, whereby the machine becomes clogged and air is driven into the skins. In my present invention, I provide means intermediate the mouth and the outlet of the hopper to obviate this difficulty, said means preferably consisting of inclined vanes mounted on a rotary annulus set in flush with the walls of the hopper, whereby said vanes are rendered bodily movable about the axis of the hopper, thus agitating the meat, scraping it from the side walls, and exerting pressure downwardly to direct the mass into the forcing chamber.

A further object of my invention is to supply a machine of this class having comparatively few parts, and these so formed as to be quickly and easily removable for the purpose of cleaning, repairing or renewing, and provided with protective means covering joints and recesses, to prevent the accidental lodgment therein of stuffing material or foreign matter which might interfere with the free coöperation of the parts.

With the above and other objects in view, my invention consists in the novel construction and combination of parts as will be hereinafter fully described and claimed.

Figure 5:
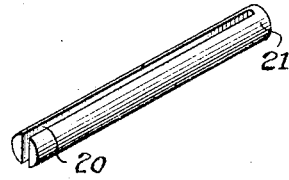
Figure 6:
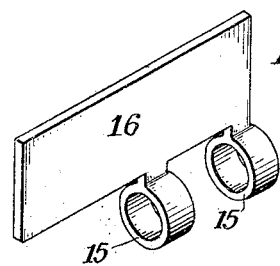
Figure 2:
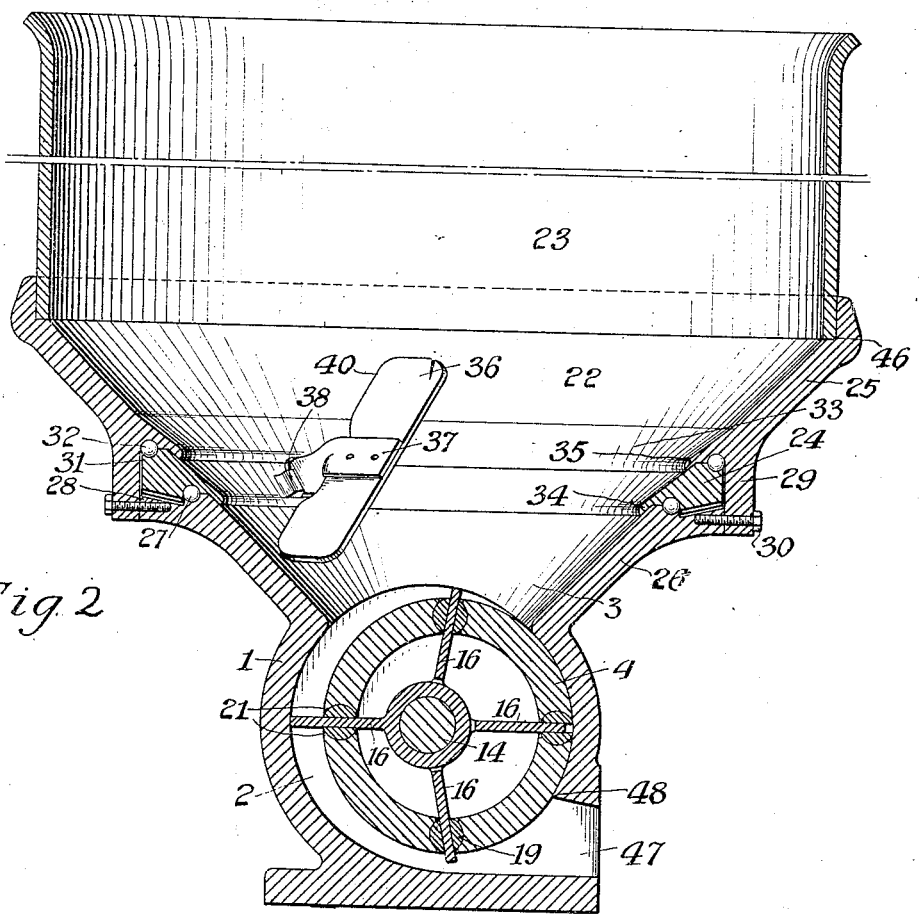
Figure 3:
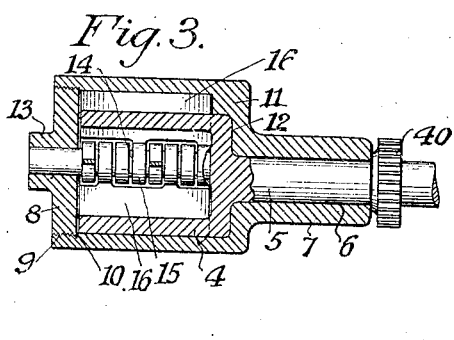
Figure 4:
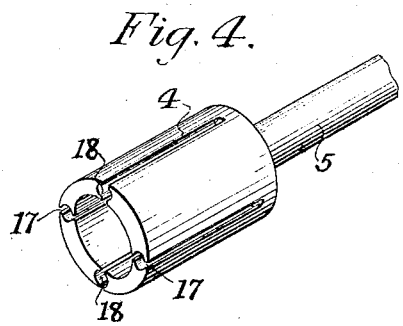

In the drawings:—Figure 1. is a side elevational view, partly in section, of the preferred embodiment of my invention. Fig. 2, is a transverse sectional view thereof on the line X X of Fig. 1. Fig. 3, is a horizontal sectional view thereof on the line Y Y of Fig. 1. Fig. 4, is a detail perspective view of the driving shaft and the hollow cylinder attached thereto; and Figs. 5 and 6 are similar views of one of the slotted roller bearings, and one of the radial slide plates, respectively.

Similar numerals of reference denote similar parts throughout the several views.

1 designates a casing having an approximately cylindrical chamber 2, formed longitudinally therein, said chamber being provided at the top with an opening 3, for the admission of the stuffing material thereto, the form of said opening being oblong and substantially rectangular, as will be hereinafter set forth. Said chamber is closed at the rear by an end wall 11, and is partially inclosed at the forward end by a wall 50, wherein is provided a threaded bore 9 and an annular shoulder 10, for the reception and impingement of a removable threaded closure head 8, and at the bottom of said chamber is a lateral opening 47 for the discharge of stuffing material under pressure. Eccentrically mounted within the chamber 2 is a revoluble drum or hollow cylinder 4, open at its forward end and closed at its rear end, where it is centrally secured to and preferably formed integral with a driving shaft 5 journaled in a longitudinal extension 7 of the casing 1. Said rear end of said cylinder is moreover seated in a circular recess 12, sunk in the inner face of the end wall 11, concentric with the bearing 6 and communicating therewith, this construction being adopted as well to avoid the lodgment of meat particles between the cylinder and the end wall as to reinforce the mechanism and partially relieve the strain on the shaft and its bearing. At its forward extremity the cylinder coincides substantially with the inner surface of the head 8 when the latter is drawn tightly into place, sufficient space only being allowed to avoid friction.

Rigidly secured to the center of the head 8 and preferably extending through a central wrench boss 13 on the outer face thereof, is a center pin 14 which projects into the cylinder 4 and occupies a central position within the chamber 2. The inner extremity of said pin coincides substantially with the inner face of the inclosed end of the cylinder, and said pin constitutes a spindle whereon are journaled by means of eyes 15, a plurality of radial slide-plates 16. Said plates are projected radially through longitudinal openings 17 in the wall of the cylinder 4, and are of such length as to contact lightly that portion of the inner wall of the casing which is exactly concentric with said pin. Preferably I make said plates of breadth throughout equal to the length of the chamber 2, and insure a firm bearing therefor on the pin 14 by securing each plate to two of the eyes 15, and so disposing the eyes on the several plates that the same will be spaced equal distances apart, whereby when operatively mounted, the plates will straddle one another, (see Fig. 3) and will all be provided with bearings of equal maximum length.

Both the interior and exterior entrances to the longitudinal openings 17 in the wall of the cylinder are flared or rounded, and said openings are transversely formed to provide suitable seats 18 for diametrically slotted roller bearings 19, wherein the plates 16 are adapted to slide, the entire construction being such that the plates will have free reciprocation upon the rotation of the cylinder, and that the varying angularity of the same with relation to the wall of the cylinder will be fully compensated, while at the same time all joints will be tight, and the interior of the cylinder thus protected against the admission of the stuffing material.

Above the casing 1, I provide a funnel shaped hopper 22, and preferably surmount the same with a cylindrical extension 23 removably seated in an annular recess 46. Within the hopper, and approximately midway the inclined walls thereof, I locate horizontally an annular rotary member 24, carrying means for agitating the meat, scraping the same from the walls of the hopper, and directing it downward into the chamber 2, and for the purpose of housing said member and providing suitable bearings therefor, I preferably divide the hopper horizontally into two parts, 25 and 26, making the lower part 26 integral with the casing 1. In this preferred construction, the said lower part of the hopper is formed by an upward divergent continuation of the walls of the casing, the latter being carried up gradually and in such manner, that while the outlet or opening 3 forming the communication between the hopper and the chamber 2, is of substantially rectangular contour, the upper portion of said part of the hopper is circular and adapted to serve as a seat for said rotary member 24. Said lower part of the hopper 26 is moreover formed with an annular flange 28, which is adapted to be embraced by an annular rim 29 depending from the upper part of the hopper 25, and said parts are secured one to the other by means of screw bolts 30, passing through the lower margin of said rim and threading into said flange. As will be seen, the inside face of the hopper wall is thus horizontally broken, and there is provided an annular recess or housing 31, wherein the rotary member 24 is received and partially inclosed. Said rotary member occupies the entire vertical space of said recess, and the inner face thereof is inclined to conform with the inclined inner face of the hopper and preserve the funnel shaped form thereof. Annular overlapping lips 34 and 35 carried downward from the rotary member and from the upper part of the hopper respectively, cover the joints of the recess and serve to exclude the meat and foreign matter therefrom.

The means which I preferably employ in association with the rotary member 24 for acting upon the meat as above mentioned, comprise elongated inclined vanes 36 secured to the inner face of said member by means of suitably bent arms 37 seated between opposing stay lugs 38 and rigidly held in place by set screws 39. Said vanes extend into the body of the hopper as shown, and rotate bodily therewith, and the outer edges 40 thereof are preferably formed and positioned to contact lightly the inclined walls of the hopper, in order to scrape adhering particles therefrom. On the upper and lower faces of the rotary member I provide annular grooves which register with corresponding grooves in the adjacent walls of the upper and lower parts of the hopper and serve as runways for ball bearings 32 and 27, and I preferably effect rotation of said member and the vanes carried thereby through an annular bevel gear 45, cut on the lower side of said member, said gear meshing with a bevel pinion 44 mounted on a shaft 42 journaled in an arm 43 formed integral with the main shaft bearing extension 7, said shaft receiving motion from the driving shaft 5 through the engaging gear pinions 40 and 41.

As will be readily understood, I may direct the sausage material into the skins by means of any suitable device attached to the discharge opening 47 at the bottom of the casing, the inner edge 48 of the upper wall of said opening being formed to scrape the cylinder and secure the complete discharge of all of said material.

In the operation of the machine, the hopper 22 and its extension 23 are filled with meat which is continuously and positively fed downward through the outlet 3 by the action of the rotating inclined vanes 36, which latter keep the meat in a state of constant agitation and by scraping the walls of the hopper effectually prevent any choking of the outlet. Upon entering the chamber 2, the meat is caught upon the revolving cylinder 4 and carried downward under pressure of the radial slide plates 16 to the opening 47, where it is discharged through the medium of a spout, or other suitable device, into the skins.

Having thus described my invention, what I claim as new and desire to secure by Letters Patent, is—

1. In a sausage stuffing machine, the combination with means for applying pressure continuously to the meat, of a vertically arranged hopper and horizontally rotary means therein for continuously feeding the meat into said pressure-applying means.

2. In a sausage stuffing machine, the combination with rotary means for applying pressure continuously to the meat and forcing the same into the skins, of a substantially vertically disposed, cone-shaped hopper communicating therewith, and meat feeding devices arranged for rotation in said hopper in a plane at right angles to the vertical axis thereof.

3. In a sausage stuffing machine, the combination with means for applying pressure continuously to the meat, of a vertically disposed cone-shaped hopper, and horizontally movable devices arranged in said hopper for continuously scraping the walls thereof and continuously feeding the meat into said pressure-applying means.

4. A continuous sausage stuffing machine comprising a substantially cylindrically chambered casing having an inlet opening at the top thereof and a lateral outlet opening at the bottom thereof, a vertically disposed cone-shaped hopper mounted on said casing and communicating therewith, said hopper comprising three parts, the lower part thereof being integral with said casing, the upper part thereof being exteriorly secured to said lower part and interiorly spaced therefrom, and the intermediate part being a rotary annulus seated between said upper and lower parts and carrying inclined vanes extending into the body of said hopper, and rotary means within said casing for carrying the meat from said inlet opening to said outlet opening and discharging the same therefrom under pressure.

5. A sausage stuffing machine having a three-part vertically disposed cone-shaped hopper, the intermediate portion of said hopper comprising a horizontally rotary annulus carrying removable inclined vanes extending into the body of said hopper, a substantially cylindrically chambered casing formed integral with the lower part of said hopper, a rotary hollow member eccentrically mounted in said casing and secured to a drive shaft carried in an extension thereof, a plurality of radial plates centrally pivoted in said casing extending through longitudinal openings in the walls of said hollow member and adapted to contact the inner peripheral face of said casing, a removable threaded pin-carrying closure head at one end of said casing; and means for imparting movement from the drive shaft of said hollow rotary member to said rotary annulus, substantially as described and for the purpose set forth.

6. In a continuous sausage stuffing machine, the combination of a casing having a chamber therein, a rotary hollow cylinder eccentrically mounted on said chamber, slide plates centrally mounted in said chamber projecting through openings in the wall of said cylinder and adapted to be rotated thereby, a removable closure head at one end of said casing, and a substantially vertical hopper disposed on said casing having rotary meat feeding means mounted therein.

In testimony whereof I have affixed my signature in the presence of two witnesses.

DAVID BRIGHTBILL.

Witnesses:
JOHN C. HOUCK,
HARVEY P. DAUGHERTY.